(12) United States Patent
Shishikura

(10) Patent No.: US 7,895,709 B2
(45) Date of Patent: Mar. 1, 2011

(54) PART MOUNTING GROMMET

(75) Inventor: Yasuyuki Shishikura, Niiza (JP)

(73) Assignee: Honda Access Corporation, Niiza-shi, Saitama-ken (JP)

( * ) Notice: Subject to any disclaimer, the term of this patent is extended or adjusted under 35 U.S.C. 154(b) by 1009 days.

(21) Appl. No.: 11/655,252

(22) Filed: Jan. 19, 2007

(65) Prior Publication Data
US 2007/0183864 A1    Aug. 9, 2007

(30) Foreign Application Priority Data

Jan. 23, 2006 (JP) ................................. 2006-014238
May 8, 2006 (JP) ................................. 2006-129519

(51) Int. Cl.
*F16L 5/00* (2006.01)

(52) U.S. Cl. ............................. 16/2.1; 411/335; 411/427

(58) Field of Classification Search ................ 16/2.1, 16/2.2, 2.5; 411/41, 45–48, 508, 509, 323, 411/913, 53, 57.1; 174/152 R, 153 G, 154, 174/152 G, 65 G; 248/56, 231.9
See application file for complete search history.

(56) References Cited

U.S. PATENT DOCUMENTS

| | | | | |
|---|---|---|---|---|
| 3,016,562 A | * | 1/1962 | Reid ............................. | 16/2.1 |
| 4,193,434 A | * | 3/1980 | Wagner ........................ | 411/154 |
| 4,385,777 A | * | 5/1983 | Logsdon ....................... | 285/12 |
| 4,621,961 A | * | 11/1986 | Gulistan ...................... | 411/352 |
| 4,732,519 A | * | 3/1988 | Wagner ........................ | 411/337 |
| 5,211,519 A | * | 5/1993 | Saito ............................ | 411/45 |
| 5,337,447 A | * | 8/1994 | Tanaka et al. ................ | 16/2.2 |
| 5,806,139 A | * | 9/1998 | Anderson et al. ............. | 16/2.1 |
| 6,364,586 B1 | * | 4/2002 | Okada .......................... | 411/41 |

FOREIGN PATENT DOCUMENTS

| | | |
|---|---|---|
| EP | 0 675 295 A1 | 10/1995 |
| FR | 2 670 253 A1 | 6/1992 |
| GB | 1 245 868 A | 9/1971 |
| GB | 1 171 772 A | 9/1986 |
| GB | 2 320 950 A | 7/1998 |
| JP | 03-096705 A | 4/1991 |

(Continued)

OTHER PUBLICATIONS

European Search Report dated May 2, 2007, Application No. GB0701254.5.

(Continued)

*Primary Examiner* — Chuck Y. Mah
(74) *Attorney, Agent, or Firm* — Westerman, Hattori, Daniels & Adrian, LLP

(57) ABSTRACT

A part mounting grommet comprises an outer grommet and an inner grommet inserted into the outer grommet and supported by the outer grommet, and supports a part provided with a mounting member beforehand on a vehicle main body. The outer grommet has a clearance in a radial direction with a mounting hole drilled in the vehicle main body, a first stopper stopped by the outer edge of one side of the mounting hole on one end thereof, and an elastically deformable first latching piece latched with the outer edge of the other side of the mounting hole. The inner grommet has a clearance in the radial direction with the outer grommet, a second stopper which abuts with the first stopper, and an elastically deformable second latching piece latched with the other end of the first stopper. The outer grommet and the inner grommet are respectively movable in the radial direction.

11 Claims, 10 Drawing Sheets

FOREIGN PATENT DOCUMENTS

| | | |
|---|---|---|
| JP | 05044680 U | 6/1993 |
| JP | 07042456 U | 2/1995 |
| JP | 7-42456 U | 8/1995 |
| JP | 07042455 U | 8/1995 |
| JP | 2590517 | 12/1998 |
| JP | 2003-072599 A | 3/2003 |
| JP | 2000-170726 A | 6/2006 |

OTHER PUBLICATIONS

Japanese Office Action dated Jul. 14, 2008, issued in corresponding Japanese Patent Application No. 2006-129519.

* cited by examiner

PART MOUNTING GROMMET

BACKGROUND OF THE INVENTION

1. Field of the Invention

The present invention relates to a part mounting grommet, and more particularly, a part mounting grommet which supports a part provided with a mounting member on a vehicle main body.

2. Description of the Related Art

Conventionally, to mount a part like a spoiler on a vehicle main body like a tailgate, mounting holes are positioned at a portion on which the spoiler is to be mounted, drilled in the tailgate, grommets are fitted into the mounting holes, and bolts are pushed in the grommets, thereby fixing the spoiler matching with the tailgate.

It is, however, difficult to precisely position the mounting holes, and this causes errors. When the errors on the positions of the mounting holes are caused, fixing the part through some of the mounting holes becomes difficult. This results in a difficulty in improving the workability.

To overcome such a problem, Japanese Registered Utility Model Publication No. 2590517 discloses a mounting grommet that comprises an outer grommet body to be attached to a plate on which a part is to be mounted, and an inner grommet body which is fitted into the outer grommet body and is movable with respect to the outer grommet body in some degree. According to the publication, an effect such that a part can be easily mounted is brought about even if an error is caused in opening a mounting hole.

According to the publication, however, the inner grommet body is movable with respect to the outer grommet body but the outer grommet body is fixed to the plate on which the part is mounted, so that a range that an error can be eliminated is limited to the movable range of the inner grommet body. Accordingly, a large error cannot be sufficiently eliminated, and this results in a difficulty in further improving the workability.

The inner grommet body is pushed in from the bottom portion of the outer grommet, and abuts with a protrusion provided in the outer grommet body. Therefore, a load in the axial direction is likely to be concentrated on the protrusion, so that the protrusion may be broken even if a load is not so large. When the protrusion is broken, the inner grommet body comes out, resulting in detachment of the spoiler.

Further, because the inner grommet body is provided with three inner stoppers with respect to the outer grommet body, it is difficult to replace the inner grommet body which is broken by detachment of a mounting member.

The present invention is made in view of the foregoing problems, and it is an object of the invention to provide a part mounting grommet which can eliminate a large error, surely prevent an inner grommet from coming out, facilitate replacement of the inner grommet, and improve the workability.

SUMMARY OF THE INVENTION

To achieve the object, a part mounting grommet according to an aspect of the invention supports a part provide with a mounting member on a vehicle main body, and comprises: an outer grommet which has a clearance in a radial direction with a mounting hole drilled in the vehicle main body, and has a first stopper stopped by an outer edge of one side of the mounting hole on one end thereof, and an elastically deformable first latching piece latched with an outer edge of the other side of the mounting hole; and an inner grommet which is inserted into the outer grommet and supported by the outer grommet, has a clearance in the radial direction with the outer grommet, and has a second stopper abutting with the first stopper, and an elastically deformable second latching piece latched with the other end of the first stopper, and wherein the outer grommet and the inner grommet are movable in the radial direction.

According to the part mounting grommet of the invention, as the outer grommet and the inner grommet are both movable in the radial direction, a further large error can be eliminated, thereby improving the workability. The second stopper is latched with the first stopper which is stopped by the outer edge of the one side of the mounting hole, and a load in the axial direction is absorbed by the vehicle main body, thereby preventing the inner grommet from coming out.

The second latching piece may be provided with a third stopper which holds the inner grommet at the center of the outer grommet in the axial direction.

The surfaces of one sides of the first stopper and the second stopper may be respectively provided with sealing members.

The first stopper may have a first sealing piece which surrounds the outer edge of the one side of the mounting hole, the second stopper may have a second sealing piece formed at that portion which abuts with the part, and a protrusion in a circular shape may be formed at a portion where the first stopper and the second stopper abut with each other.

The inner grommet may have a folded crow at a bottom end of the second latching piece, a bottom portion of the folded crow being tapered.

The outer grommet may have the first latching piece at that seat face, and the part may be sandwiched between the seat face and the first stopper.

The second stopper may be formed in a disk-like shape.

An inner edge of one end of the outer grommet may be formed in a letter-R-like shape.

An inner edge of one end of the inner grommet may be formed in a letter-R-like shape.

The first sealing piece may have a sealing surface abutting with the one side of the mounting hole at a leading end thereof, and a clearance between the sealing surface and an upper end of the first latching piece may be so set as to be smaller than a plate thickness of the vehicle main body.

The second sealing piece may have a sealing surface abutting with a surface of the part at a leading end thereof, the sealing surface protruding upward the surface of the second stopper which abuts with the part.

DETAILED DESCRIPTION OF THE PREFERRED EMBODIMENTS

1. First Embodiment

A preferred embodiment of the invention will be explained with reference to the accompanying drawings.

(1) General Structure

Figure 1:
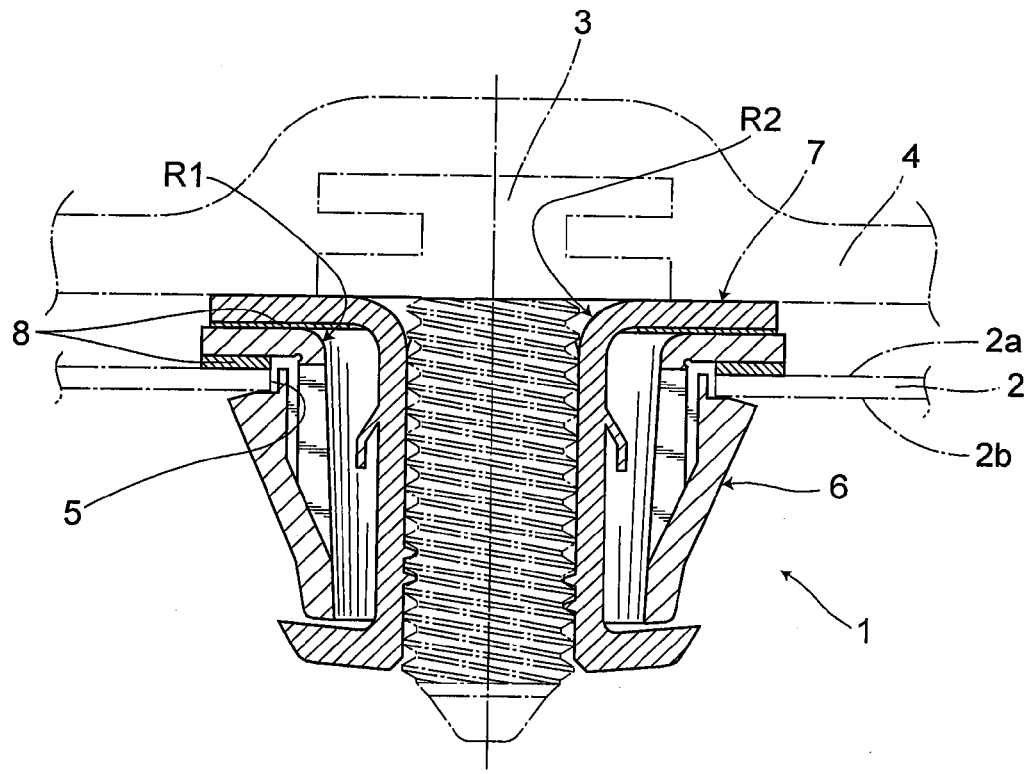
FIG. 1 is a vertical cross-sectional view illustrating the general structure of a part mounting grommet according to a first embodiment of the invention.

A part mounting grommet 1 illustrated in FIG. 1 is fitted to a vehicle main body 2 like a tailgate, and fixing a spoiler 4, which has a bolt 3 functioning as a mounting member and undergone insert molding, to the vehicle main body 2 by supporting the bolt 3. The part mounting grommet 1 is structured in such a manner as to be movable in the radial direction (horizontal direction in FIG. 1) of a mounting hole 5 drilled in the vehicle main body 2. The bolt 3 has a sharp leading end.

The part mounting grommet 1 is formed of a rigid synthetic resin or the like, and comprises an outer grommet 6 which is fitted to the vehicle main body 2, and an inner grommet 7 which is inserted into the outer grommet 6 and supported by the outer grommet 6. The bolt 3 is inserted into the inner grommet 7, the spoiler 3 is sandwiched between a seat 3a of the bolt 3 and the inner grommet 7, and the bolt 3 is engaged with the inner grommet 7, thereby fixing the spoiler 4. For watertightness of the vehicle main body 2, the part mounting grommet 1 is fitted to the vehicle main body 2 via a seal member 8. The seal member 8 may be made of various materials, but is preferably made of an ethylene-propylene-diene terpolymer (EPDM) or a high polymer synthetic sponge body like a neoprene sponge. Note that an inner edge R1 of one end of the outer grommet on a side that the inner grommet 7 is inserted is formed in a letter R-like shape to facilitate insertion of the inner grommet 7. An inner edge R2 of one end of the inner grommet 7 on a side that the bolt 3 is inserted is formed in a letter R-like shape to facilitate insertion of the bolt 3.

Figure 2:
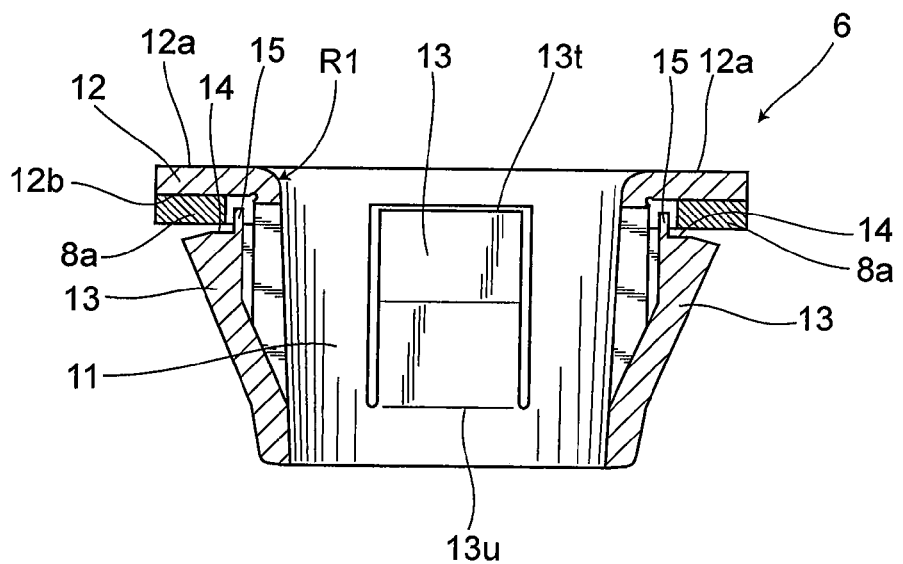
FIG. 2 is a vertical cross-sectional view illustrating the structure of an outer grommet.

As illustrated in FIG. 2, the outer grommet 6 is formed in a cylindrical shape, and has a cylinder portion 11, a first stopper 12 provided at one end of the cylinder portion 11, and first latching pieces 13 provided around the outer circumference of the cylinder portion 11. The cylinder portion 11 is formed in such a manner as to have a clearance in the radial direction of the mounting hole 5. In practice, the external diameter of the cylinder portion 11 is smaller than the internal diameter of the mounting hole 5 to set the clearance to 1 mm for each side, so that the outer grommet 7 becomes movable in the radial direction of the mounting hole 5.

The first stopper 12 is constituted by forming the one end of the cylinder portion flanged. A front face 12a and a rear face 12b of the first stopper 12 are so formed as to be approximately vertical to the central axis of the cylinder portion 11. The entire rear face 12b of the first stopper 12 is provided with a first sealing member 8a which constitutes the seal member 8.

The first latching piece 13 is formed by the outer wall of the cylinder portion 11 inclined gradually from the other end toward the one end, inclined inwardly by elastic deformation when inserted into the mounting hole 5, and elastically returns outwardly to the original position after inserted. The first latching piece 13 is formed by notching the sides of the portion of the cylinder portion 11 but leaving one side thereof unnotched, and causing the notched portion to protrude outwardly. Therefore, the first latching piece 13 can incline in the radial direction of the cylinder portion 11 with a bottom end 13u being a supporting point.

An upper end 13t of the first latching piece 13 is provided with a seat face 14 and a return protrusion 15. The seat face 14 is formed in such a manner as to sandwich the spoiler 4 and the first sealing member 8a with the rear face 12b of the first stopper 12. The return protrusion 15 is provided at a position where the return protrusion 15 abuts with the inner edge of the mounting hole 5, and is provided in such a manner as to be vertical with respect to the seat face 14 in a protruding manner. The outer grommet 7 has the plurality of first latching pieces 13 (in the embodiment, evenly four).

Figure 3:
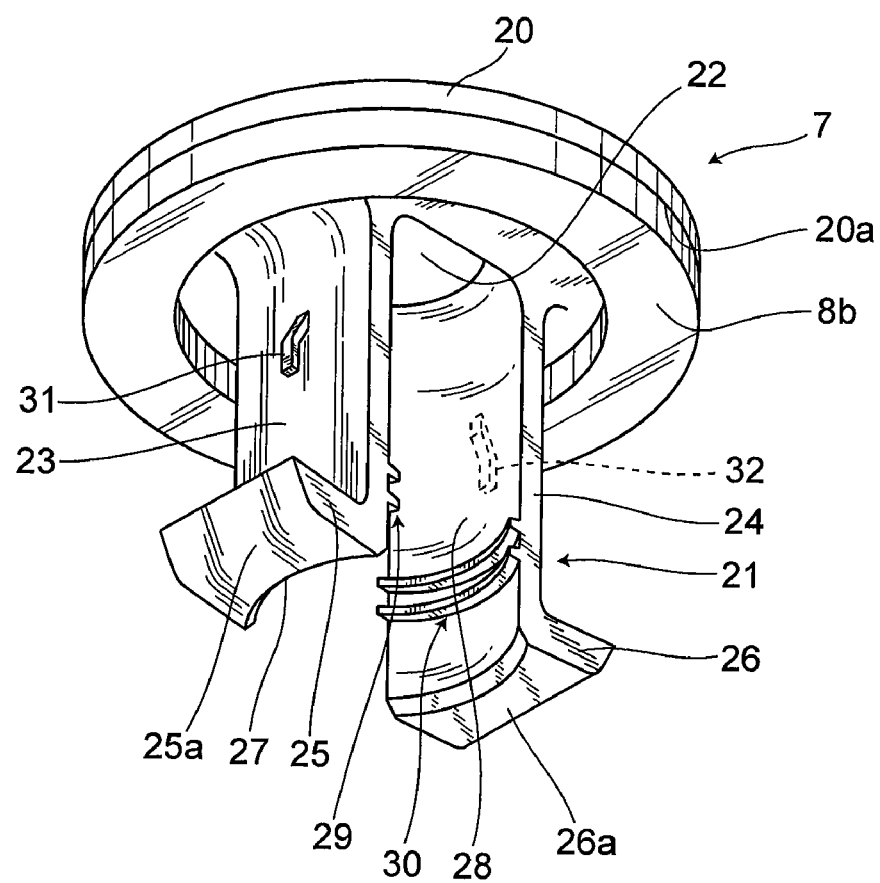
FIG. 3 is a perspective view illustrating the structure of an inner grommet.

As illustrated in FIG. 3, the inner grommet 7 has a second stopper 20 and a second latching piece 21 integrally provided with the second stopper 20.

The second stopper 20 is so formed as to be latched with the first stopper 12. The second stopper 20 is formed in a disk-like shape having a through hole 22 on the center thereof, and has a second sealing member 8b which constitutes the seal member 8 on an entire surface 20a (rear face) which abuts with the first stopper 12.

The second latching piece 21 comprises a pair of a first leg 23 and a second leg 24 across the through hole 22 and is vertically provided on the surface 20a of the second stopper 20 in a protruding manner. The first leg 23 and the second leg 24 are formed in such a manner as to have a clearance in the radial direction with respect to the internal diameter of the cylinder portion 11 of the outer grommet 6. In practice, the first leg 23 and the second leg 24 are formed as to be smaller than the internal diameter of the cylinder portion 11 to set a clearance to 2 mm for each side. Accordingly, the inner grommet 7 is movable in the radial direction with respect to the outer grommet 6.

Each of the first leg 23 and the second leg 24 has a letter L shaped vertical cross section, has an upper end connected to the second stopper 20, and the bottom end vertically folded outwardly to form a folded crow 25 or 26. The folded crows 25, 26 have sizes in such a way as not to be released from the other end of the outer grommet 6 even if the inner grommet 6 is moved in the radial direction with respect to the outer grommet 6. Bottom portions 25a, 26a of the folded crows 25, 26 are so formed as to be easily inserted into the outer grommet 6. The bottom portions 25a, 26a of the folded crows 25, 26 are tapered upwardly so as to incline toward the leading ends thereof. The first leg 23 and the second leg 24 can incline with the upper ends thereof being supporting points.

The second latching piece 21 is structured in such a manner as to catch the bolt 3. In the embodiment, each of surfaces 27, 28 of the first leg 23 and the second leg 24 which constitute the second latching piece 21 is curved with the same curvature radius as that of the through hole 22 so that the bolt 3 can be inserted, and is provided with a latching protrusion 29 or 30 which engages with the thread of the bolt 3.

The second latching piece 21 has third stoppers 31, 32 for holding the inner grommet 7 at the center of the outer grommet 6 in the axial direction. The third stoppers 31, 32 are respectively provided on the outer faces of the first leg 23 and the second leg 24, and protrude outwardly.

(2) Working and Effect

Next, the working of the foregoing structure will be explained.

(2-1) When There is No Error on the Position of the Mounting Hole

Figure 4A:
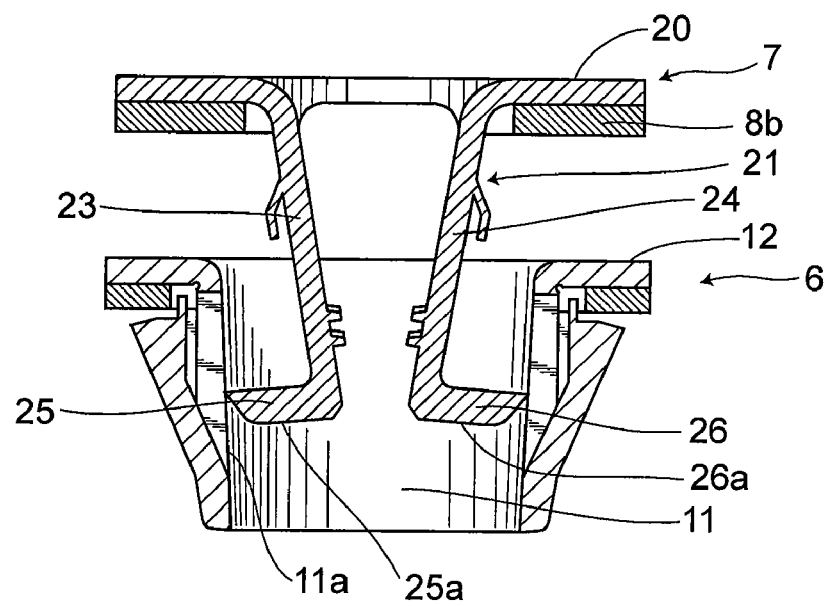
FIGS. 4A and 4B are vertical cross-sectional views illustrating a way how the inner grommet is fitted into the outer grommet step by step.
Figure 4B:
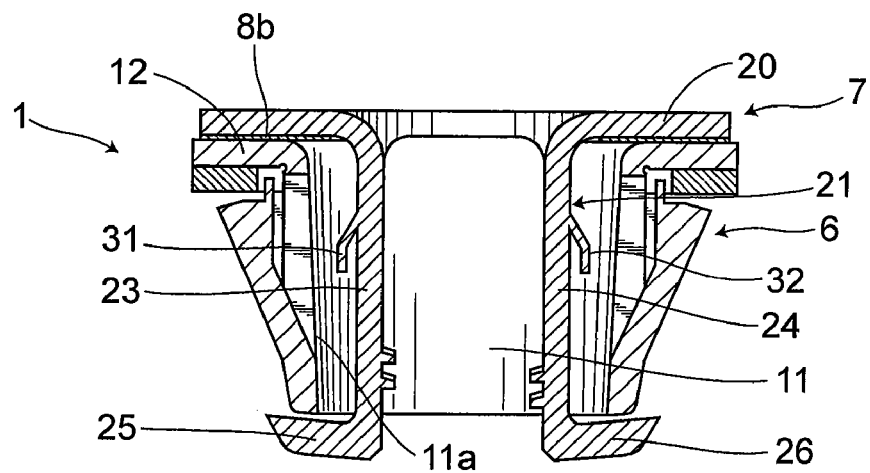

First, an explanation will be given of the working of each structural portion when the part mounting grommet 1 is fabricated with reference to FIG. 4. To fabricate the part mounting grommet 1, the inner grommet 7 is pushed in from the one end side of the outer grommet 6 (FIG. 4A). The folded crows 25, 26 of the pushed-in inner grommet 7 are pressed by an internal wall 11a of the cylinder portion 11, and the second latching piece 21 performs elastic deformation and becomes narrower inwardly. Thus, the inner grommet 7 is inserted into the outer grommet 6 with the second latching piece 21 becoming narrower, and when the leading end of the second latching piece 21 reaches the other end of the outer grommet 6, the second latching piece 21 performing elastic returning, and the folded crows 25, 26 are latched with the other end of the outer grommet 6 (FIG. 4B). Simultaneously, the inner grommet 7 becomes to have the second stopper 20 caught by the first stopper 12, and the second sealing member 8b is compressed in the axial direction. The inner grommet 7 becomes a single part with the outer grommet 6 by the second stopper 20 and the second latching piece 21.

As mentioned above, the inner edge R1 of the one end of the outer grommet 6 on a side that the inner grommet 7 is inserted is formed in a letter R-like shape, and this facilitates insertion of the inner grommet 7. Further, the bottom portions of the folded crows 25, 26 are tapered, and this further facilitates insertion of the inner grommet 7 into the outer grommet 6.

Because the second latching piece 21 which can perform elastic deformation is provided with the folded crows 25, 26, the outer grommet 6 and the inner grommet 7 which is inserted from the one end side of the outer grommet 6 can be surely a single part.

Providing the third stoppers 31, 32 makes it possible to hold the inner grommet 7 at the center of the outer grommet 6, thereby preventing the folded crows 25, 26 from being released from the other end of the outer grommet 6.

Figure 5A:
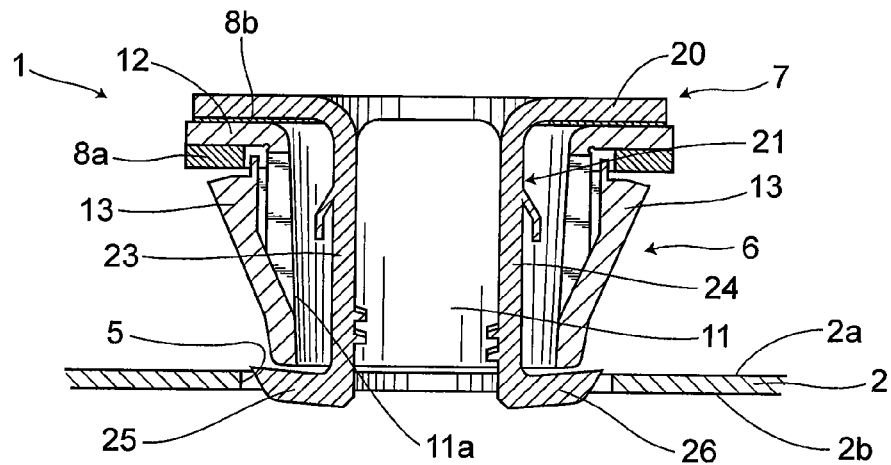
FIGS. 5A to 5C are vertical cross-sectional view illustrating a way how the part mounting grommet is fitted to a vehicle main body step by step.
Figure 5B:
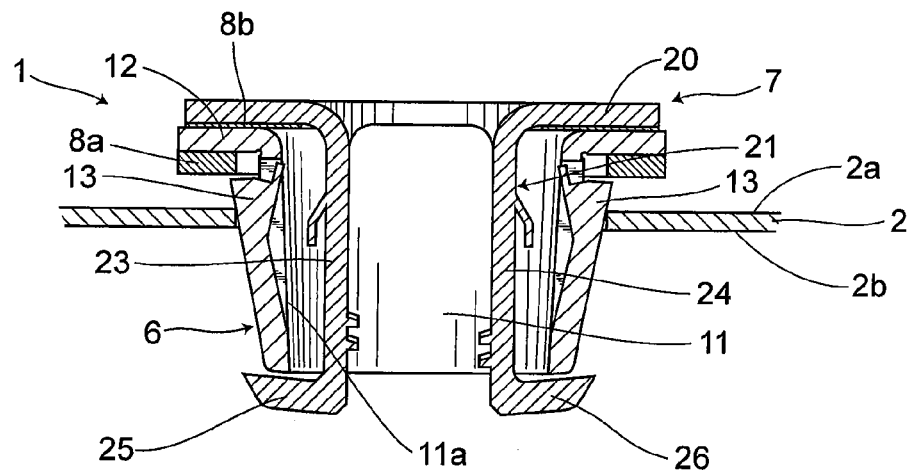
Figure 5C:
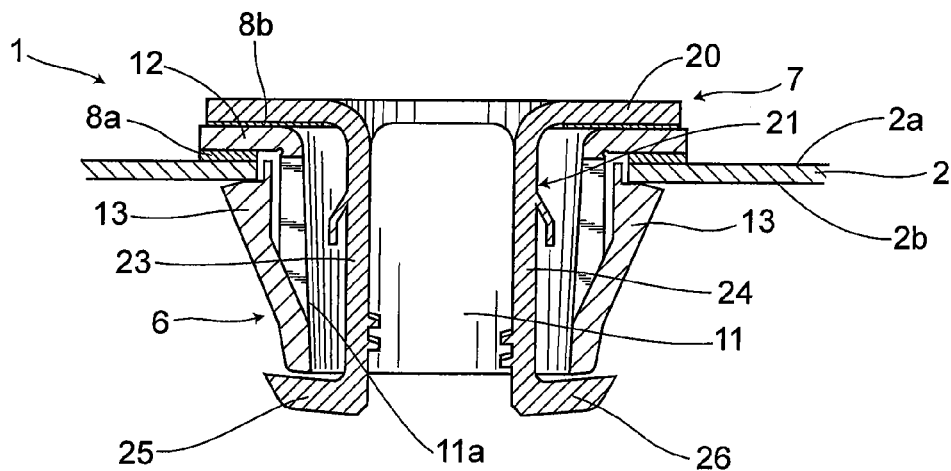

Next, an explanation will be given of the working of each structural part when the part mounting grommet 1 is fitted to the vehicle main body 2 with reference to FIGS. 5A to 5C. To fit the part mounting grommet 1 to the vehicle main body 2, the part mounting grommet 1 is disposed on one side 2a of the mounting hole 5, and pressed in (FIG. 5A). The pressed-in part mounting grommet 1 becomes to have the first latching pieces 13 pressed by the inner edge of the mounting hole 5 and performing elastic deformation, and becoming narrower (FIG. 5B). The part mounting grommet 1 is inserted into the mounting hole 5 with the first latching pieces 13 becoming narrower in this manner, and when the upper ends of the first latching pieces 13 reach an other side 2b of the mounting hole 5, the first latching pieces 13 perform elastic returning, and are latched with the outer edge of the mounting hole 5 on the other side 2b. Simultaneously, the part mounting grommet 1 becomes to have the first stopper 12 abutting with the outer edge of the mounting hole 5 on the one side 2a and latched with the one side of the vehicle main body 2. The part mounting grommet 1 is fitted to the vehicle main body 2 while sandwiching the one side 2a and the other side 2b of the mounting hole 5 by the first stopper 12 and the first latching pieces 13.

As mentioned above, the first latching pieces 13 are so formed as to incline gradually and outwardly from the other end side of the outer grommet 6 toward the one end side thereof, this facilitates insertion of the part mounting grommet 1 into the mounting hole 5.

Because the first latching pieces 13 can perform elastic deformation, the part mounting grommet 1 can be fitted to the vehicle main body 2 from the one side of the mounting hole 5 in an one-touch manner. The seat faces 14 of the first latching pieces 13 can surely prevent the part mounting grommet 1 from coming out even if the part mounting grommet 1 moves in the radial direction.

As the first sealing member 8a is provided on the rear side of the first stopper 12, the mounting hole 5 can be watertight. Likewise, as the second sealing member 8b is provided on the rear side of the second stopper 20, the inner grommet 7 and the outer grommet 6 can be watertight, thereby improving the watertightness of the vehicle main body 2 further.

Figure 6:
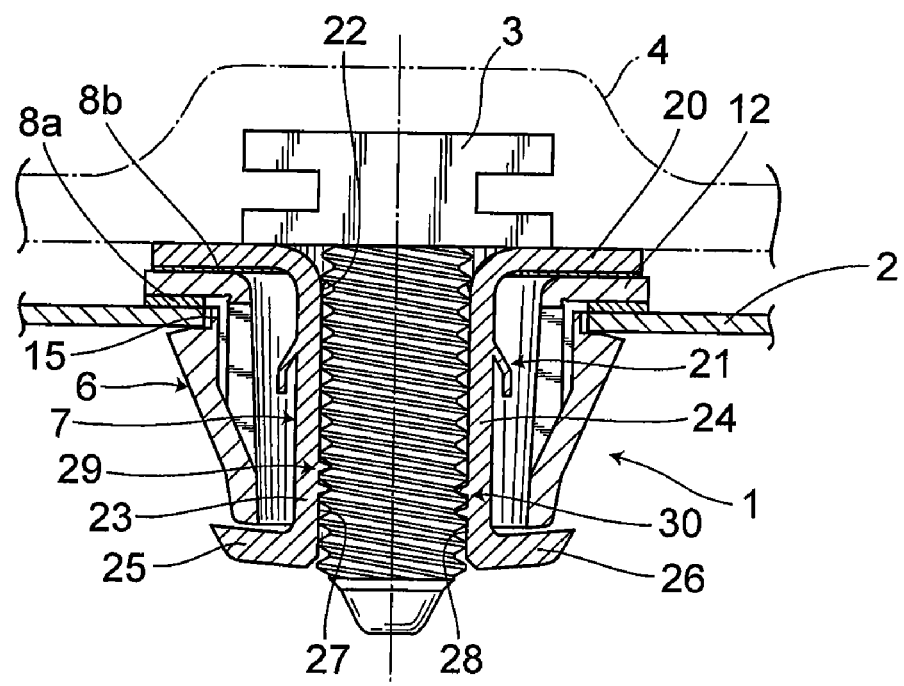
FIG. 6 is a vertical cross-sectional view illustrating a state where a spoiler is mounted.

Next, an explanation will be given of the working of each structural part when the spoiler 4 is mounted on the vehicle main body 2 with reference to FIG. 6. To mount the spoiler 4 on the vehicle main body 2, the spoiler 4 which is provided with the bolt 3 beforehand is disposed on the one side of the mounting hole 5 into which the part mounting grommet 1 has been inserted. Next, the bolt 3 is inserted into the through hole 22 until the surface of the spoiler 4 abuts with the surface of the second stopper 20. The thread of the bolt 3 is engaged with the latching protrusions 29, 30, thereby fixing the spoiler 4 to the vehicle main body 2.

As mentioned above, because the inner grommet 7 is pressed into the outer grommet 6 from the one side of the mounting hole 5 and the second stopper 20 formed in a disk-like shape is stopped by the flanged first stopper 12, when a load is applied in the axial direction, the load is not concentrated on the inner grommet 7 unlike the conventional technology, and is absorbed by the vehicle main body 2. Accordingly, the part mounting grommet 1 can have an improved strength, and is prevented from being come out from the vehicle main body 2.

The second latching piece 21 comprises the first leg 23 and the second leg 24, and, each of the opposing surfaces 27, 28 is so curved as to have the same curvature radius than that of the through hole 22 and provided with the latching protrusion 29 or 30, so that the pressed-in bolt 3 can be surely caught, thereby preventing the spoiler 4 from being detached.

Providing the return protrusion 15 makes it possible to hold the part mounting grommet 1, which has a clearance with the mounting hole 5, at the center of the mounting hole 5, thereby facilitating insertion of the bolt 3.

The first leg 23 and the second leg 24 spread to a predetermined width when the bolt 3 is inserted into the second latching piece 21, this causes the folded crows 25, 26 to rigidly latch with the other end of the outer grommet 6.

Because the spoiler is provided with the bolt 3 beforehand, unlike the conventional technology, a cover which covers a mounting member becomes unnecessary, thereby reducing the man-hour and the cost.

Because the spoiler 4 can be surely fixed by causing the bolt 3 to be latched with the second latching piece 21, unlike the conventional technology, a two-sided tape for preventing the spoiler 4 from lifting becomes unnecessary, thereby reducing the cost further.

The inner edge R2 of the one end of the inner grommet on a side that the bolt 3 is inserted is formed in a letter-R-like shape, this facilitates insertion of the bolt 3.

The second latching piece 21 comprises a pair of pieces sandwiching the through hole 22, and is latched with the outer grommet 6 at two points, replacement of the inner grommet 7 damaged by removal of the bolt 3 becomes easy in comparison with a conventional case where the inner grommet body is held at three points.

Because the bolt 3 has a sharp leading end, it is easy to insert the bolt 3 into the part mounting grommet 1, thereby improving the workability.

(2-2) When there is an Error on the Position of the Mounting Hole

Figure 7A:
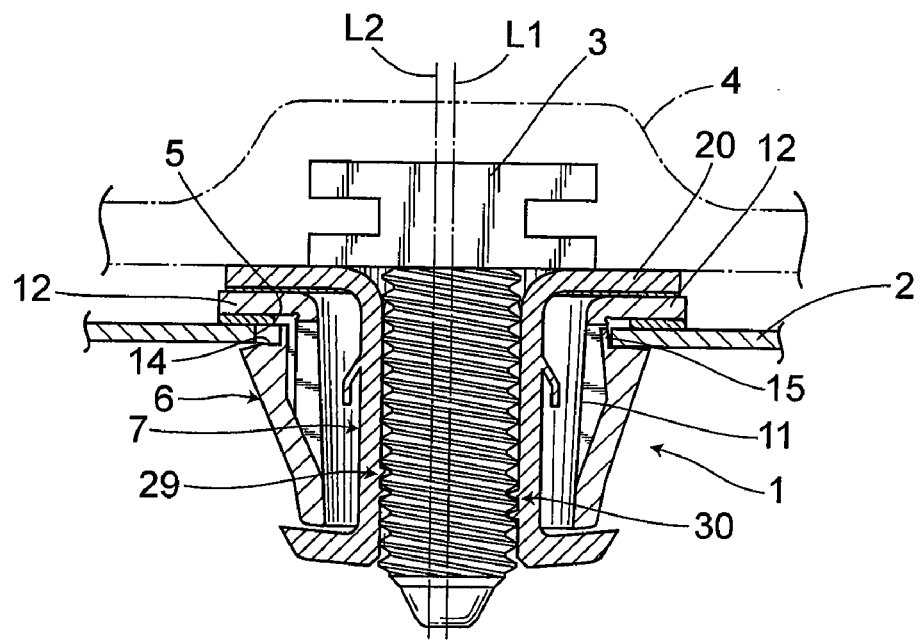
FIGS. 7A and 7B are vertical cross-sectional views illustrating a way how an error caused on a mounting hole is eliminated, FIG. 7A illustrating a state where the outer grommet is moved, and FIG. 7B illustrating a state where the inner grommet is moved.
Figure 7B:
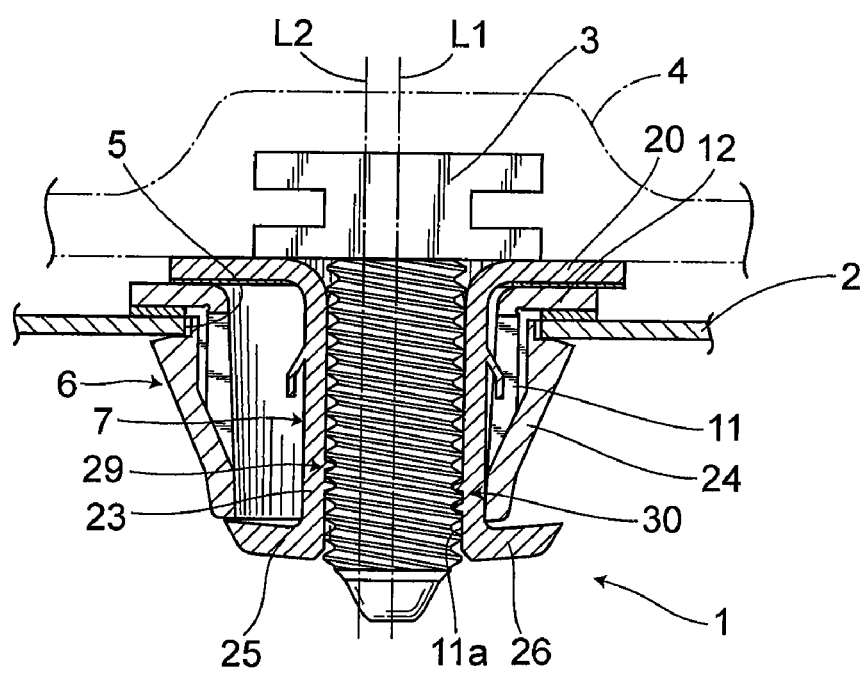

Next, the working of each structural part when the mounting hole 5 is shifted because of an error caused in positioning or forming the mounting hole 5 will be explained with reference to FIGS. 7A and 7B. For the convenience of the explanation, a case where the mounting hole 5 is shifted to the left from a specified position will be explained with FIGS. 7A and 7B. Note that L1 in the figure is the center line of the mounting hole 5 which indicates the specified position, and L2 is the center line of the shifted mounting hole 5. The procedures until the part mounting grommet 1 is fitted to the vehicle main body 2 is the same as the foregoing procedures, so that redundant explanations thereof will be omitted.

First, an explanation will be given of a case where the outer grommet 6 cancels an error. Because the cylinder portion 11 has a clearance with respect to the mounting hole 5, the cylinder portion 11 can be shifted by what corresponds to the clearance. When the mounting hole 5 is shifted from the specified position and the return protrusion 15 abuts with the inner edge of the mounting hole 5, the return protrusion 15 is pressed by the inner edge of the mounting hole 5. Accordingly, the part mounting grommet 1 is shifted to the right while the first latching pieces 13 are inclined inwardly until the return protrusion 15 becomes flat with the outer face of the cylinder portion 11 (FIG. 7A). Therefore, even if the mounting hole 5 is shifted from the specified position, the outer grommet 6 can be moved in the radial direction of the mounting hole 5 at 1 mm at maximum, so that the bolt 3 can be easily inserted into the inner grommet 7, thereby surely fixing the spoiler 4.

When the outer grommet 6 is moved to a position where the return protrusion 15 becomes flat with the outer face of the cylinder portion 11, the first stopper 12 and the seat face 14 sandwiches the vehicle main body 2, thereby preventing the part mounting grommet 1 from coming out.

Next, an explanation will be given of a case where the inner grommet 7 cancels an error. Because the second latching piece 21 has a clearance with respect to the internal diameter of the cylinder portion 11, the second latching piece 21 can be shifted by what corresponds to the clearance. That is, when the mounting hole 5 is shifted to the left from the specified position, the inner grommet 7 is moved to the right until the outer surface of the second leg 24 abuts with the internal wall 11a of the cylinder portion 11. Therefore, even if the mounting hole 5 is shifted from the specified position, the inner grommet 7 can move in the radial direction of the mounting hole 5 at 2 mm at maximum, so that the bolt 3 can be easily inserted into the inner grommet 7, thereby surely fixing the spoiler 4.

Figure 8:
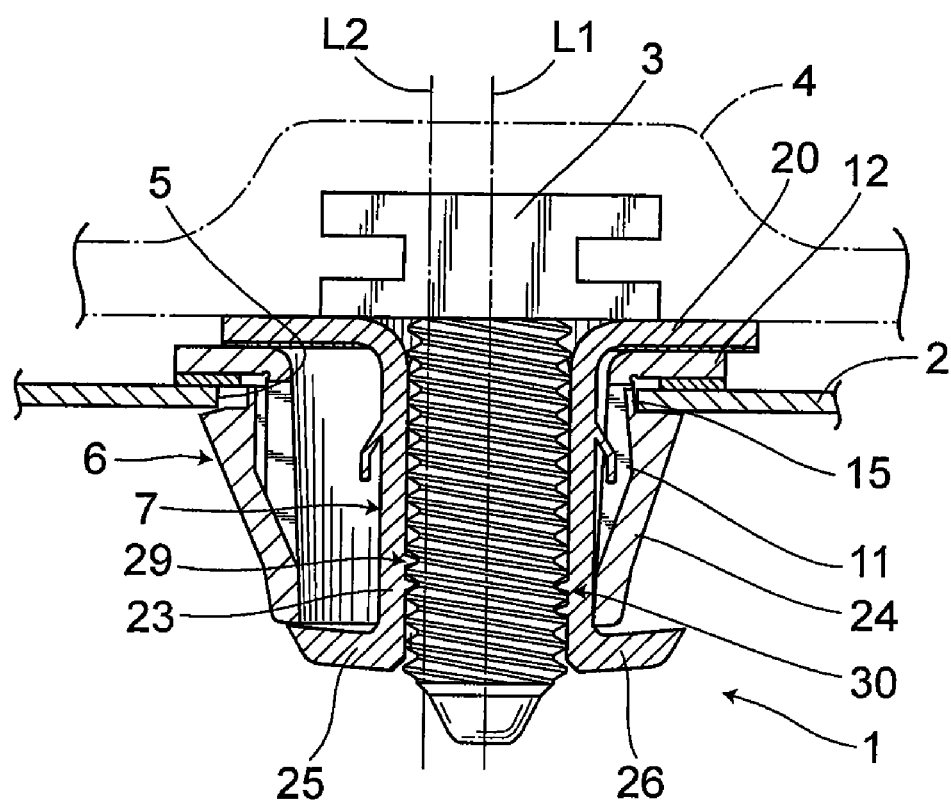
FIG. 8 is a vertical cross-sectional view illustrating a state where the outer grommet and the inner grommet are moved together.

The outer grommet 6 and the inner grommet 6 can be moved with each other with respect to a caused error. That is, as illustrated in FIG. 8, even if a larger error on the position of the mounting hole 5 is caused, the outer grommet 6 and the inner grommet 7 are moved in the same direction, and the outer grommet 6 and the inner grommet 7 are moved together at 3 mm at maximum, thereby eliminating the error, so that the spoiler 4 can be surely held.

As mentioned above, in the embodiment, the part mounting grommet 1 has the outer grommet 6 and the inner grommet 7 each of which is movable in the radial direction when pressed by the bolt 3 in a case where an error on the position of the mounting hole 5 is caused, and can eliminate a larger error, thereby improving the workability. The second stopper 20 is latched with the first stopper 12 which is stopped by the outer edge of the one side of the mounting hole 5, this prevents a stress in the axial direction from being concentrated on the inner grommet 7, and prevents the inner grommet 7 from coming out.

Because the third stoppers 31, 32 hold the inner grommet 7 at the center of the outer grommet 6 in the axial direction, the inner grommet 7 which has a clearance with the outer grommet 6 can be held at the center of the mounting hole 5, this facilitates insertion of the bolt 3, thereby improving the workability.

The bottom faces of the first stopper 12 and the second stopper 20 are provided with the seal member 8, so that the vehicle main body 2 becomes watertight.

2. Second Embodiment

Figure 9:
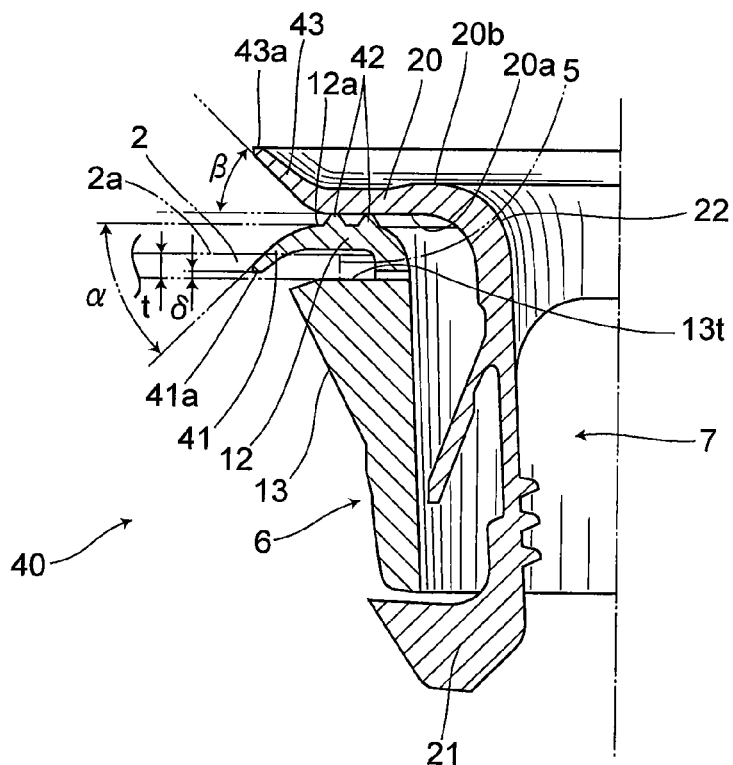
FIG. 9 is a vertical cross-sectional view illustrating a general structure of a part mounting grommet according to a second embodiment of the invention.

Next, an explanation will be given of a second embodiment of the invention with reference to FIG. 9 in which the same structural parts as those of the first embodiment in FIG. 1 are denoted by the same reference numerals. Note that the difference of a part mounting grommet 40 illustrated in FIG. 9 from the first embodiment is that a fist sealing piece 41, protrusions 42, and a second sealer 43 are integrally formed with the outer grommet 6 and the inner grommet 7.

That is, the first stopper 12 of the outer grommet 6 has the first sealing piece 41 which seals a portion where the outer grommet 6 and the vehicle main body 2 abut with each other, thereby preventing water from entering into the vehicle main body 2. The first sealing piece 41 is formed by causing the outer circumference end of the first stopper 12 to incline toward the one side of the mounting hole 5 as to surround the mounting hole 5, and has a sealing face 41a which can abut with the one side of the mounting hole 5 on the leading end of the first sealing piece 41. The first sealing piece 41 is formed in such a way that a clearance 8 formed between the sealing face 41a and an upper end 13t of the first latching piece 13 becomes smaller than a plate thickness t of the vehicle main body 2. The first sealing piece 41 is formed at an angle α with respect to a horizontal plane which is a predetermined angle, e.g., 45 degree in such a manner as to be pressed by the one side 2a of the vehicle main body 2 and deformed when the first sealing piece 41 is fitted to the vehicle main body 2. The first sealing piece 41 has the sealing face 41a formed in a disk-like shape and surrounding the outer circumference of the mounting hole 5, thereby preventing water from entering into the vehicle main body 2 from a portion where the outer grommet 6 and the vehicle main body 2 abut with each other.

The second stopper 20 of the inner grommet 7 has a second sealing piece 43 which seals a portion where the inner grommet 7 and the spoiler 4 abut with each other, thereby preventing water from entering into the vehicle main body 2. The second sealing piece 43 is formed by causing the outer circumference end of the second stopper 20 to incline toward a surface 4*a* of the spoiler 4 in such a manner as to surround the through hole, and has a sealing face 43*a* which abuts with the surface 4*a* of the spoiler 4 at the leading end of the second sealing piece 43. The second sealing piece 43 is formed in such a way that the sealing face 43*a* protrudes upward a surface 20*b* of the second stopper 20 which abuts with the spoiler 4. The second sealing piece 43 is formed at an angle β which is a predetermined angle, e.g., 45 degree in such a manner as to be pressed by the surface 4*a* of the spoiler 4 and deformed when the spoiler 4 is mounted. The second sealing piece 43 has the sealing face 43*a* formed in a disk-like shape and surrounding the outer circumference of the through hole 22, thereby preventing water from entering into the vehicle main body 2 from a portion where the inner grommet 7 and the spoiler 4 abut with each other.

Note that the first sealing piece 41 and the second sealing piece 43 are so formed as to be elastically deformed by a load in the axial direction.

The outer grommet 6 has the protrusions 42 which seal a portion where the first stopper 12 and the second stopper 20 abut with each other to prevent water from entering into the vehicle main body 2. The protrusion 42 is formed by lifting a surface 12*a* of the first stopper 12 which abuts with the second stopper 20 in a circular shape, and has an upper end which abuts with the rear face of the second stopper 20. As the surface 12*a* is lifted circularly to form the protrusions 42 successively, the part mounting grommet 40 seals a portion where the outer grommet 6 and the inner grommet 7 overlap, thereby preventing water from entering into the vehicle main body 2. In the embodiment, the plurality of, for example, two protrusions 42 are formed in concentric circular shapes. However, the part mounting grommet 40 may have one protrusion 42.

Figure 10:
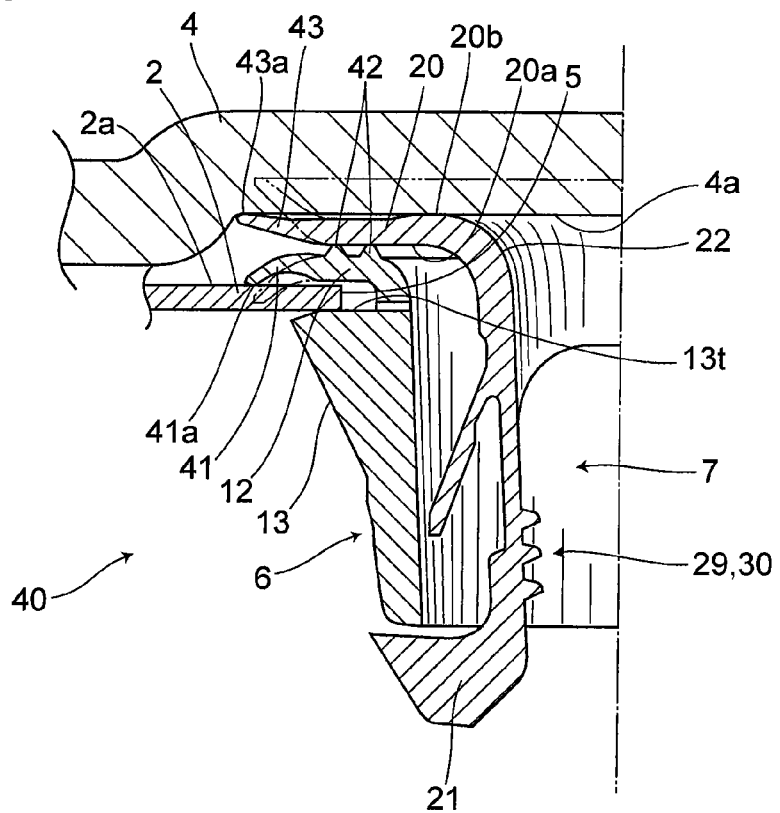
FIG. 10 is a vertical cross-sectional view illustrating a state where a spoiler is mounted.

As illustrated in FIG. 10, the part mounting grommet 40 structured in this manner has the inner grommet 7 inserted into the outer grommet 6 and structured as to be a single part with the outer grommet 6 by the second stopper 20 and the second latching piece 21 of the inner grommet 7.

When the part mounting grommet 40 is fitted to the vehicle main body 2, the vehicle main body 2 is sandwiched in the clearance 6 between the first latching pieces 13 and the first stopper 12. At this time, the first sealing piece 41 has the sealing face 41*a* pressed upward the vehicle main body 2 and so deformed as to expand in the radial direction because the clearance 6 is set smaller than the plate thickness t of the vehicle main body 2. The first sealing piece 41 can surely seal a portion where the vehicle main body 2 and the outer grommet 6 abut with each other in this manner by pressing the sealing face 41*a* against the one side 2*a*.

The bolt 3 of the spoiler 4 provided beforehand is pressed into the through hole 22 of the part mounting grommet 40 which has been fitted to the vehicle main body 2, and the thread of the bolt 3 is engaged with the latching protrusions 29, 30, thereby fixing the spoiler 4 to the vehicle main body 2. The second sealing piece 43 is formed in such a manner as to protrude upward the surface 20*b* of the second stopper 20 which abuts with the vehicle main body 2 when the bolt 3 is pressed in to a predetermined position, the sealing face 43*a* is pressed downward the spoiler 4, and so deformed as to expand in the radial direction. The second sealing piece 43 causes the sealing face 43*a* to be pressed against the surface 4*a* of the spoiler 4 in this manner, thereby surely sealing a portion where the spoiler 4 and the inner grommet 7 abut with each other.

Because the second sealing piece 43 receives a load in the downward direction, the second stopper 20 causes outward moment whose rotational center is the inner edge R2 of the inner grommet 7. Because of the moment, the second stopper 20 is strongly pressed against the protrusions 42 formed at the first stopper 12. As the surface 20*a* of the second stopper 20 is strongly pressed against the protrusions 42 formed at the first stopper 12 in this manner, the part mounting grommet 40 can improve a sealing property at a portion where the first stopper 12 and the second stopper 20.

The part mounting grommet 40 has the first sealing piece 41 and the protrusions 42 formed integral with the outer grommet 6 and the second sealing piece 43 formed integral with the inner grommet 7, this reduces the cost for each part and the fabrication man-hour, resulting in significant cost reduction.

As the protrusions 42 integrally provided with the first stopper 12 seals a portion where the first stopper 12 and the second stopper 20 abut with each other, the part mounting grommet 40 can reduces the height thereof protruding from the one side 2*a* of the vehicle main body 2, so that the degree of freedom for designing can be improved.

Because the part mounting grommet 40 has the protrusions 42 provided at a portion where the first stopper 12 and the second stopper 20 abut with each other, force in the axial direction generated when the spoiler 4 is fixed to the vehicle main body 2 can be caused to act on the protrusions 42. Therefore, by strongly pressing the protrusions 42 against the surface 20*a*, the part mounting grommet 40 can improve the sealing property, thereby securely preventing water from entering into the vehicle main body 2.

Because the part mounting grommet 40 has the protrusions 42 formed in circular shapes, the sealing property is secured even if the inner grommet 7 moves in the radial direction with respect to the outer grommet 6.

Because the part mounting grommet 40 has the first sealing piece 41 formed integral with the first stopper 12 and the second sealing piece 43 formed integral with the second stopper 20, force in the axial direction generated when the spoiler 4 is fixed to the vehicle main body 2 can be caused to act on the protrusions 42. Therefore, by strongly pressing the sealing surface 41*a* against the one side 2*a* of the vehicle main body 2 and pressing the sealing surface 43*a* against the surface 4*a* of the spoiler 4, the part mounting grommet 40 can improve the sealing property, thereby surely preventing water from entering into the vehicle main body 2.

As the part mounting grommet 40 has the first sealing piece 41 formed in such a manner as to surround the outer edge of the one side 2*a* of the mounting hole 5, and the second sealing piece 43 formed in such a manner as to surround the through hole 22, the sealing property can be secured even if the outer grommet 6 moves in the radial direction with respect to the through hole 22, and the inner grommet 7 moves in the radial direction with respect to the outer grommet 6.

As the part mounting grommet 40 employs a structure such that the first sealing piece 41 and the second sealing piece 43 are deformed and pressed against the vehicle main body 2 and the spoiler 4, the thickness of a portion which protrudes toward the one side 2*a* of the vehicle main body 2 can be reduced. Therefore, the part mounting grommet 40 can reduce the limitation for designing, thereby improving the merchantability.

The part mounting grommet 40 employs a structure such that the first sealing piece 41 and the second sealing piece 43 are deformed and pressed against the vehicle main body 2 and the spoiler 4, thereby improving the capability of coping with a curved surface. Therefore, even if the vehicle main body 2 and the spoiler 4 have curved surfaces, the part mounting grommet 40 can surely prevent water from entering into the vehicle main body 2.

The part mounting grommet 40 has the deformable first sealing piece 41 and second sealing piece 43, thereby absorbing shock applied to the spoiler 4. Therefore, the part mounting grommet 40 can prevent the spoiler 4 from being damaged, improving the durability.

The plurality of, for example, two protrusions 42 are formed in concentric circular shapes with respect to the through hole 22, and can seal the vehicle main body 2, thereby surely preventing water from entering into the vehicle main body 2 when the outer grommet 6 and the inner grommet 7 are shifted in the radial direction.

Figure 11A:
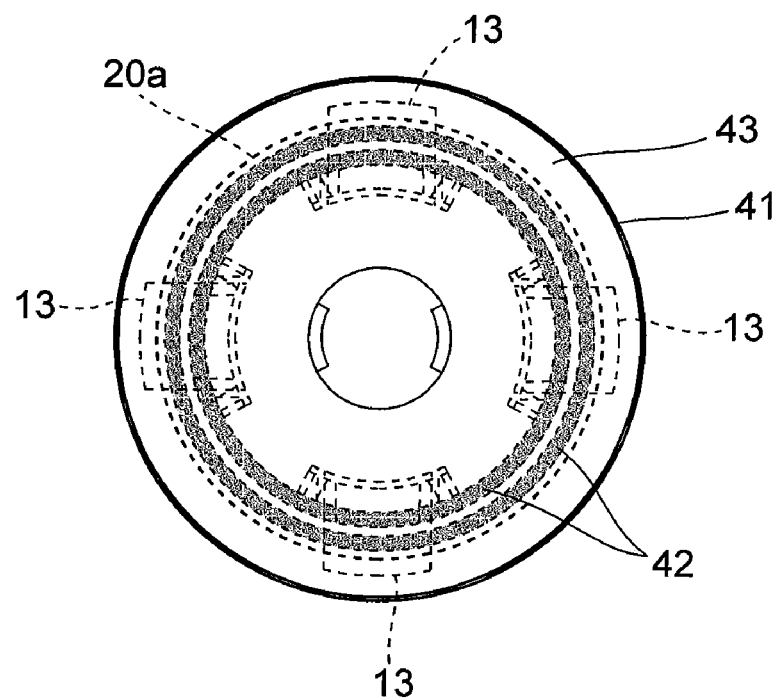
FIGS. 11A and 11B are top plan views illustrating the positional relationship between an outer grommet and an inner grommet, FIG. 11A illustrating a state where the outer and inner grommets are in a reference position, and FIG. 11B illustrating a state where the inner grommet is shifted to the left with respect to the outer grommet.
Figure 11B:
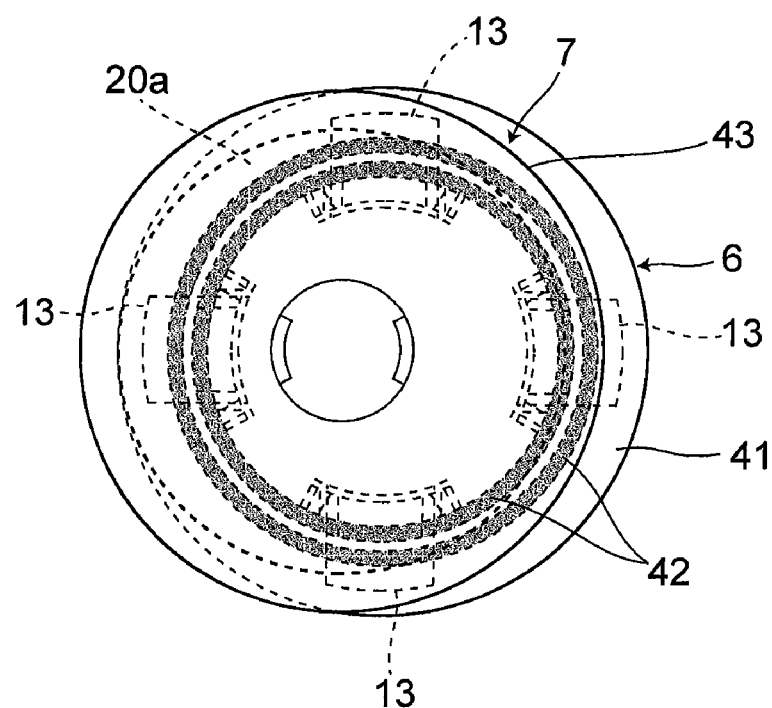
Figure 12:
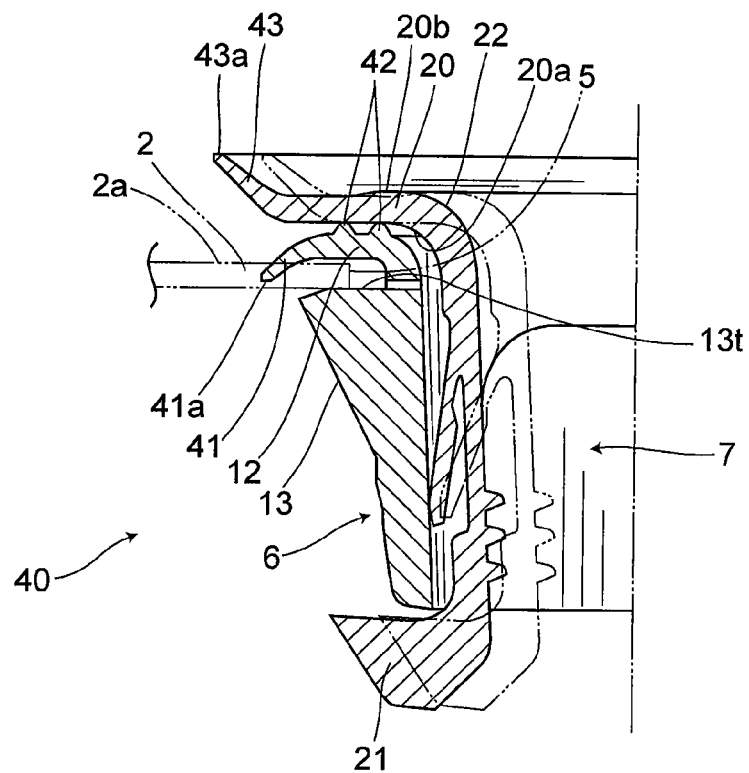
FIG. 12 is a left vertical cross-sectional view illustrating a state where the inner grommet is shifted to the left with respect to the outer grommet.

That is, as illustrated in FIGS. 11A and 11B, when the mounting hole 5 is shifted to the right from a specified position (FIG. 11B), the inner grommet 7 moves to the left in the radial direction with respect to the outer grommet 6, thereby cancelling misalignment. When the inner grommet 7 moves to the left with respect to the outer grommet 6 in this manner, the two protrusions 42 abut with the surface 20a of the second stopper 20 at the left of the part mounting grommet 40 (FIG. 12), so that the vehicle main body 2 is surely sealed.

Figure 13:
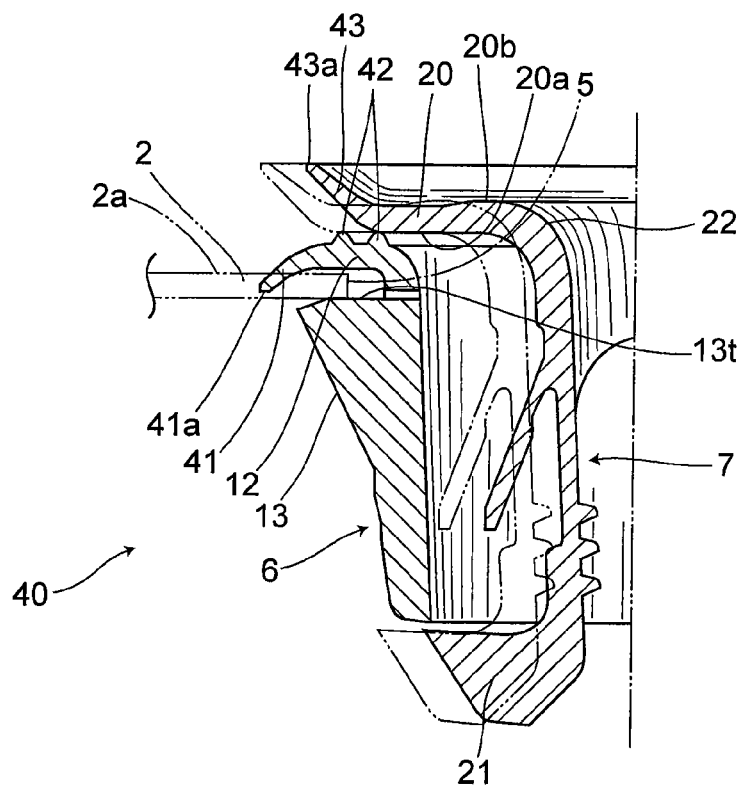
FIG. 13 is a right vertical cross-sectional view illustrating a state where the inner grommet is shifted to the left with respect to the outer grommet.

At the right of the part mounting grommet 40 (FIG. 13), the inner protrusion 42 abuts with the surface 20a of the second stopper 20, so that the vehicle main body 2 is surely sealed.

The present invention is not limited to the foregoing embodiments, and can be modified in various forms within the scope of the invention. For example, a case where the mounting member is the bolt 3 is exemplified, but the invention is not limited to this case, and a rod member having engagement portions which engage with the latching protrusions 29, 30 may be employed. The clearance between the outer grommet 6 and the mounting hole 5 and the clearance between the outer grommet 6 and the inner grommet 7 are not limited to the described ones in the foregoing embodiment, and can be changed appropriately in accordance with a material, a shape thereof, and the like.

The explanation has been given of the case where the first sealing piece 41 and the second sealing piece 43 are respectively integral with the outer grommet 6 and the inner grommet 7 in the second embodiment. Those pieces are formed integral with the respective grommets, but the invention is not limited to a case where those pieces are formed of the same materials as those of the grommets. Therefore, the part mounting grommet 40 may have the first sealing piece 41 and the second sealing piece 43 formed of different materials from those of the outer grommet 6 and the inner grommet 7, but formed integral with the respective grommets.

Although the explanation has been given of a case where the first stopper 12 has the protrusions 42 in the second embodiment, the invention is not limited to this case, and the second stopper 20 may have the protrusions 42 at that portion which abuts with the first stopper 12.

What is claimed is:

1. A part mounting grommet that supports a part provided with a mounting member on a vehicle main body, said part mounting grommet comprising:
an outer grommet having a cylindrical shape, wherein said outer grommet has a clearance in a radial direction with a mounting hole drilled in said vehicle main body, and has a first stopper stopped by an outer edge of a first side of said mounting hole, and an elastically deformable first latching piece latched with an outer edge of a second side of said mounting hole; and
an inner grommet which is inserted into said outer grommet and supported by said outer grommet, has a clearance in said radial direction with said outer grommet, and has a second stopper abutting with said first stopper, and an elastically deformable second latching piece latched with an other end of said outer grommet, and wherein
said second latching piece comprises a plurality of legs and is provided on said second stopper, and
said outer grommet and said inner grommet are movable in said radial direction.

2. The part mounting grommet according to claim 1, wherein said second latching piece is provided with a third stopper which holds said inner grommet at the center of said outer grommet in an axial direction.

3. The part mounting grommet according to claim 1, wherein surfaces of one sides of said first stopper and said second stopper are respectively provided with sealing members.

4. The part mounting grommet according to claim 1, wherein said first stopper has a first sealing piece which surrounds said outer edge of said one side of said mounting hole,
said second stopper has a second sealing piece formed at that portion which abuts with said part, and
a circular-shaped protrusion extends from a top surface of said first stopper and abuts a bottom surface of said second stopper.

5. The part mounting grommet according to claim 1, wherein said inner grommet has a folded crow at a bottom end of said second latching piece, a bottom portion of said folded crow being tapered.

6. The part mounting grommet according to claim 1, wherein said outer grommet has said first latching piece is provided with a seat face, and said part is sandwiched between said seat face and said first stopper.

7. The part mounting grommet according to claim 1, wherein said second stopper is formed in a disk-like shape.

8. The part mounting grommet according to claim 1, wherein an inner edge of one end of said outer grommet is formed in a letter-R-like shape to facilitate insertion of the inner grommet.

9. The part mounting grommet according to claim 1, wherein an inner edge of one end of said inner grommet is formed in a letter-R-like shape to facilitate insertion of a fastener.

10. The part mounting grommet according to claim 4, wherein said first sealing piece has a sealing surface abutting with said one side of said mounting hole at a leading end thereof, and a clearance between said sealing surface and an upper end of said first latching piece is so set as to be smaller than a plate thickness of said vehicle main body.

11. The part mounting grommet according to claim 4, wherein said second sealing piece has a sealing surface abutting with a surface of said part at a leading end thereof, said sealing surface protruding upward a surface of said second stopper which abuts with said part.

* * * * *